United States Patent
Ozaki et al.

(10) Patent No.: US 11,089,177 B2
(45) Date of Patent: Aug. 10, 2021

(54) READING DEVICE, IMAGE FORMING APPARATUS, AND IMAGE READING METHOD

(71) Applicants: Tatsuya Ozaki, Kanagawa (JP); Tadaaki Oyama, Kanagawa (JP); Tomohiro Sasa, Tokyo (JP); Hiroki Shirado, Kanagawa (JP); Kohsuke Nambara, Kanagawa (JP); Masamoto Nakazawa, Kanagawa (JP)

(72) Inventors: Tatsuya Ozaki, Kanagawa (JP); Tadaaki Oyama, Kanagawa (JP); Tomohiro Sasa, Tokyo (JP); Hiroki Shirado, Kanagawa (JP); Kohsuke Nambara, Kanagawa (JP); Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 16/589,258

(22) Filed: Oct. 1, 2019

(65) Prior Publication Data
US 2020/0120228 A1    Apr. 16, 2020

(30) Foreign Application Priority Data
Oct. 12, 2018    (JP) .............................. JP2018-193870

(51) Int. Cl.
*H04N 1/04*    (2006.01)
*H04N 1/028*    (2006.01)
*H04N 1/00*    (2006.01)

(52) U.S. Cl.
CPC ....... *H04N 1/0285* (2013.01); *H04N 1/00034* (2013.01); *H04N 1/00708* (2013.01)

(58) Field of Classification Search
CPC ............. H04N 1/0285; H04N 1/00034; H04N 1/00708

(Continued)

(56) References Cited

U.S. PATENT DOCUMENTS

2006/0132859 A1 *   6/2006   Kalapathy ............ H04N 5/2357
                                                    358/463
2007/0188638 A1     8/2007   Nakazawa et al.
(Continued)

FOREIGN PATENT DOCUMENTS

JP    10-336404    12/1998
JP    2012-119868    6/2012
(Continued)

OTHER PUBLICATIONS

U.S. Appl. No. 16/533,984, filed Aug. 7, 2019, Masamoto Nakazawa, et al.
(Continued)

*Primary Examiner* — Cheukfan Lee
(74) *Attorney, Agent, or Firm* — Oblon, McClelland, Maier & Neustadt, L.L.P.

(57) ABSTRACT

A reading device includes: a light source that irradiates a subject with scanning light; a light receiving section that receives reflection light from the subject; and circuitry to: control the light source to switch on and off of the scanning light; control the light receiver to receive the reflection light from the subject for a predetermined acquisition time at a predetermined acquisition interval so as to acquire data; and calculate a difference between the data acquired while the scanning light is switched on and the data acquired while the scanning light is switched off. The predetermined acquisition time and the predetermined acquisition interval are set such that the acquisition time or a total time of the acquisition time and the acquisition interval become an integer multiple of a fluctuation cycle of a fluctuation factor.

14 Claims, 20 Drawing Sheets

(58) Field of Classification Search
USPC .................................. 358/475, 488, 449
See application file for complete search history.

(56) References Cited

U.S. PATENT DOCUMENTS

| | | |
|---|---|---|
| 2008/0252787 A1 | 10/2008 | Nakazawa et al. |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2011/0249069 A1 | 10/2011 | Oyama |
| 2012/0057211 A1 | 3/2012 | Shirado |
| 2012/0224205 A1 | 9/2012 | Nakazawa |
| 2012/0236373 A1 | 9/2012 | Oyama |
| 2013/0063792 A1 | 3/2013 | Nakazawa |
| 2014/0029065 A1 | 1/2014 | Nakazawa |
| 2014/0043629 A1 | 2/2014 | Shirado |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2014/0376063 A1 | 12/2014 | Sasa |
| 2015/0098117 A1 | 4/2015 | Marumoto et al. |
| 2015/0116794 A1 | 4/2015 | Nakazawa |
| 2015/0158309 A1 | 6/2015 | Fujii et al. |
| 2015/0163378 A1 | 6/2015 | Konno et al. |
| 2015/0222790 A1 | 8/2015 | Asaba et al. |
| 2015/0249762 A1 | 9/2015 | Ishida et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0088179 A1 | 3/2016 | Nakazawa et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0219163 A1 | 7/2016 | Shirado et al. |
| 2016/0268330 A1 | 9/2016 | Nakazawa et al. |
| 2016/0295138 A1 | 10/2016 | Asaba et al. |
| 2016/0347052 A1 | 12/2016 | Kawarada et al. |
| 2016/0366288 A1 | 12/2016 | Sasa et al. |
| 2016/0373604 A1 | 12/2016 | Hashimoto et al. |
| 2017/0019547 A1 | 1/2017 | Ozaki |
| 2017/0019567 A1 | 1/2017 | Konno et al. |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0245803 A1* | 8/2017 | Ahmed .............. A61B 5/02416 |
| 2017/0295298 A1 | 10/2017 | Ozaki et al. |
| 2017/0302821 A1 | 10/2017 | Sasa et al. |
| 2017/0324883 A1 | 11/2017 | Konno et al. |
| 2018/0139345 A1 | 5/2018 | Goh et al. |
| 2018/0146150 A1 | 5/2018 | Shirado et al. |
| 2018/0175096 A1 | 6/2018 | Inoue et al. |
| 2018/0213124 A1 | 7/2018 | Yokohama et al. |
| 2018/0220027 A1* | 8/2018 | Kusuhata ........... H04N 1/00753 |
| 2018/0261642 A1 | 9/2018 | Asaba et al. |
| 2019/0163112 A1 | 5/2019 | Nikaku et al. |
| 2019/0166274 A1 | 5/2019 | Ishii et al. |
| 2019/0166275 A1 | 5/2019 | Ishii et al. |
| 2019/0208149 A1 | 7/2019 | Asaba et al. |
| 2019/0238702 A1 | 8/2019 | Ikemoto et al. |

FOREIGN PATENT DOCUMENTS

| | | |
|---|---|---|
| JP | 2013-085047 | 5/2013 |
| JP | 2013-141079 | 7/2013 |

OTHER PUBLICATIONS

U.S. Appl. No. 16/536,575, filed Aug. 9, 2019, Masamoto Nakazawa, et al.

U.S. Appl. No. 16/431,954, filed Jun. 5, 2019, Ayumu Hashimoto, et al.

U.S. Appl. No. 16/381,520, filed Apr. 11, 2019, Masamoto Nakazawa, et al.

U.S. Appl. No. 16/374,146, filed Apr. 3, 2019, Hideki Hashimoto, et al.

U.S. Appl. No. 16/269,592, filed Feb. 7, 2019, Masamoto Nakazawa, et al.

* cited by examiner

READING DEVICE, IMAGE FORMING APPARATUS, AND IMAGE READING METHOD

CROSS-REFERENCE TO RELATED APPLICATIONS

This patent application is based on and claims priority pursuant to 35 U.S.C. § 119(a) to Japanese Patent Application No. 2018-193870, filed on Oct. 12, 2018, in the Japan Patent Office, the entire disclosure of which is hereby incorporated by reference herein.

BACKGROUND

Technical Field

The present invention relates to a reading device, an image forming apparatus, and an image reading method.

Discussion of the Background Art

In a reading device that reads an image or the like of a document, a document size is detected by performing pre-scanning to simply read a part of the document before performing main scanning to read an image.

For example, there is a disclosed technology in which a document size is detected by performing pre-scanning in a device that detects a document size, image data is acquired in a state in which a light source is switched on when an angle between a document cover and a platen becomes a reference angle, subsequently image data is acquired in a state in which the light source is switched off, and these two kinds of data are used to acquire data in which influence of disturbance light is eliminated.

In a case where a fluctuation factor such as the disturbance light is caused by, for example, light of a fluorescent lamp or the like, intensity of the fluctuation factor cyclically fluctuates at a predetermined frequency (e.g., 100 Hz or 120 Hz). In this case, an image data level (an integral value of a value indicating the intensity of disturbance light, or the like) may fluctuate in accordance with timing to acquire image data. Thus, in a case where the intensity of the fluctuation factor cyclically fluctuates, the influence of the fluctuation factor may not be sufficiently eliminated even though the two kinds of data acquired in a lit state and an unlit state are used like the above-described conventional art.

SUMMARY

Example embodiments of the present invention include a reading device includes: a light source that irradiates a subject with scanning light; a light receiving section that receives reflection light from the subject; and circuitry to: control the light source to switch on and off of the scanning light; control the light receiver to receive the reflection light from the subject for a predetermined acquisition time at a predetermined acquisition interval so as to acquire data; and calculate a difference between the data acquired while the scanning light is switched on and the data acquired while the scanning light is switched off. The predetermined acquisition time and the predetermined acquisition interval are set such that the acquisition time or a total time of the acquisition time and the acquisition interval become an integer multiple of a fluctuation cycle of a fluctuation factor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
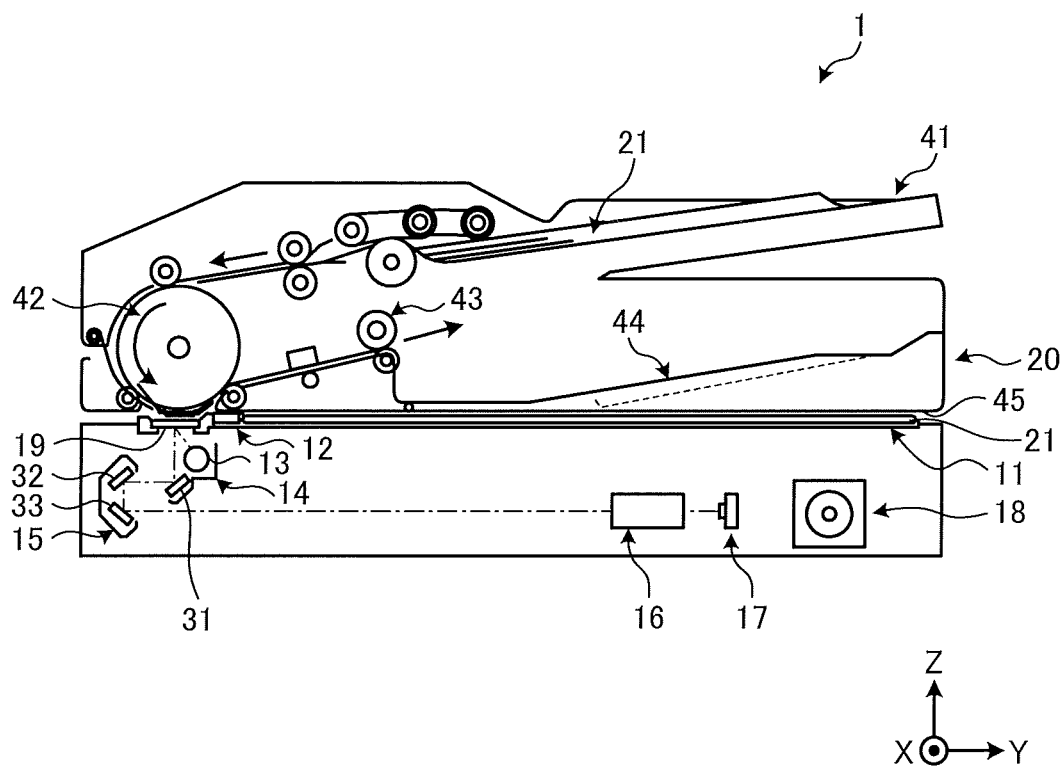
FIG. 1 is a view illustrating an exemplary hardware configuration of a reading device according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a reading device, an image forming apparatus, and a reading method will be described below in detail with reference to the attached drawings. The present invention is not limited by the following embodiments, and constituent elements in the following embodiments include those easily conceivable by a man skilled in the art, substantially the same, and included in so-called equivalent scopes. Various omissions, substitutions, changes, and combinations of the constituent elements can be made without departing from the gist of the following embodiments.

First Embodiment

Hardware Configuration of Reading Device

FIG. 1 is a view illustrating an exemplary hardware configuration of a reading device 1 according to a first embodiment. In the drawing, an X-axis corresponds to a main-scanning direction, a Y-axis corresponds to a sub-scanning direction, and a Z-axis corresponds to a height direction.

The reading device 1 according to the present embodiment includes a contact glass 11, a reference white board 12, a light source 13 (lighting), a first carriage 14, a second carriage 15, a lens 16, a sensor board 17 (light receiving section), and a scanner motor 18, a reading window 19, and an auto document feeder (ADF) 20.

The contact glass 11 is a transparent plate-shaped member on which a document 21 (subject) having an image to be read is placed.

The reference white board 12 is a white plate-shaped member to reflect light to be a reference in a case where scanning light is emitted from the light source 13. Image data acquired from reflection light from the reference white board 12 is used in shading correction and the like.

The light source 13 is a unit that emits the scanning light toward the contact glass 11 (document 21), and can include a light-emitting diode (LED), a light guide, and the like, for example. The light source 13 emits the scanning light in order to perform: size detection processing to detect a size of each document 21; and image reading processing to read an image of the document 21.

The first carriage 14 is a unit including the light source 13 and a first mirror 31 and movable in the sub-scanning direction (Y-axis direction) by drive force of a scanner motor 18, or the like. The first mirror 31 reflects, to the second carriage 15 side, reflection light of the scanning light emitted from the light source 13.

The second carriage 15 is a unit including a second mirror 32 and a third mirror 33 and movable in the sub-scanning direction by the drive force of the scanner motor 18, or the like. The second mirror 32 reflects reflection light from the first carriage 14 (first mirror 31) to the third mirror 33. The third mirror 33 reflects reflection light from the second mirror 32 to the lens 16.

The lens 16 condenses reflection light from the second carriage 15 (third mirror 33).

The sensor board 17 includes a line sensor such as a charge-coupled device (CCD) or a complementary metal oxide semiconductor (CMOS). The sensor board 17 photoelectrically converts the reflection light collected by the lens 16 to generate image data (reading data) indicating an image of each document 21.

The scanner motor 18 is controlled by a predetermined control unit to move the first carriage 14 and the second carriage 15.

The reading window 19 includes a transparent plate-shaped member, similarly to the contact glass 11. During reading processing using the ADF 20, the document 21 is irradiated with the scanning light through the reading window 19, and the reflection light from the document 21 is received.

The ADF 20 supplies a plurality of documents 21 one by one to the reading window 19. The ADF 20 includes a document tray 41, a conveyance drum 42, a sheet ejection roller 43, a sheet ejection tray 44, and a background portion 45.

The documents 21 conveyed one by one from the ADF 20 are exposed to the scanning light from the light source 13 at the time of passing through the reading window 19. The reflection light from the document 21 is reflexed by the respective mirrors 31 to 33 of the first carriage 14 and the second carriage 15, passes through the lens 16, and is subjected to size reduction and image formation on a light receiving surface of the line sensor on the sensor board 17.

The document 21 is irradiated with the scanning light from the light source 13 arranged below the contact glass 11 in flat-bed reading to read each document 21 fixed on the contact glass 11 while moving both of the carriages 14 and 15. The reflection light from the document 21 is reflexed by the mirrors 31 to 33 of both of the carriages 14 and 15, passes through the lens 16, and is subjected to size reduction and image formation on the light receiving surface of the line sensor on the sensor board 17. At this time, a moving speed of the second carriage 15 is a half of a moving speed of the first carriage 14. Note that the first carriage 14, the second carriage 15, the lens 16, the sensor board 17, and the like are separate bodies but may also be integrated.

Functional Configuration of Reading Device

Figure 2:
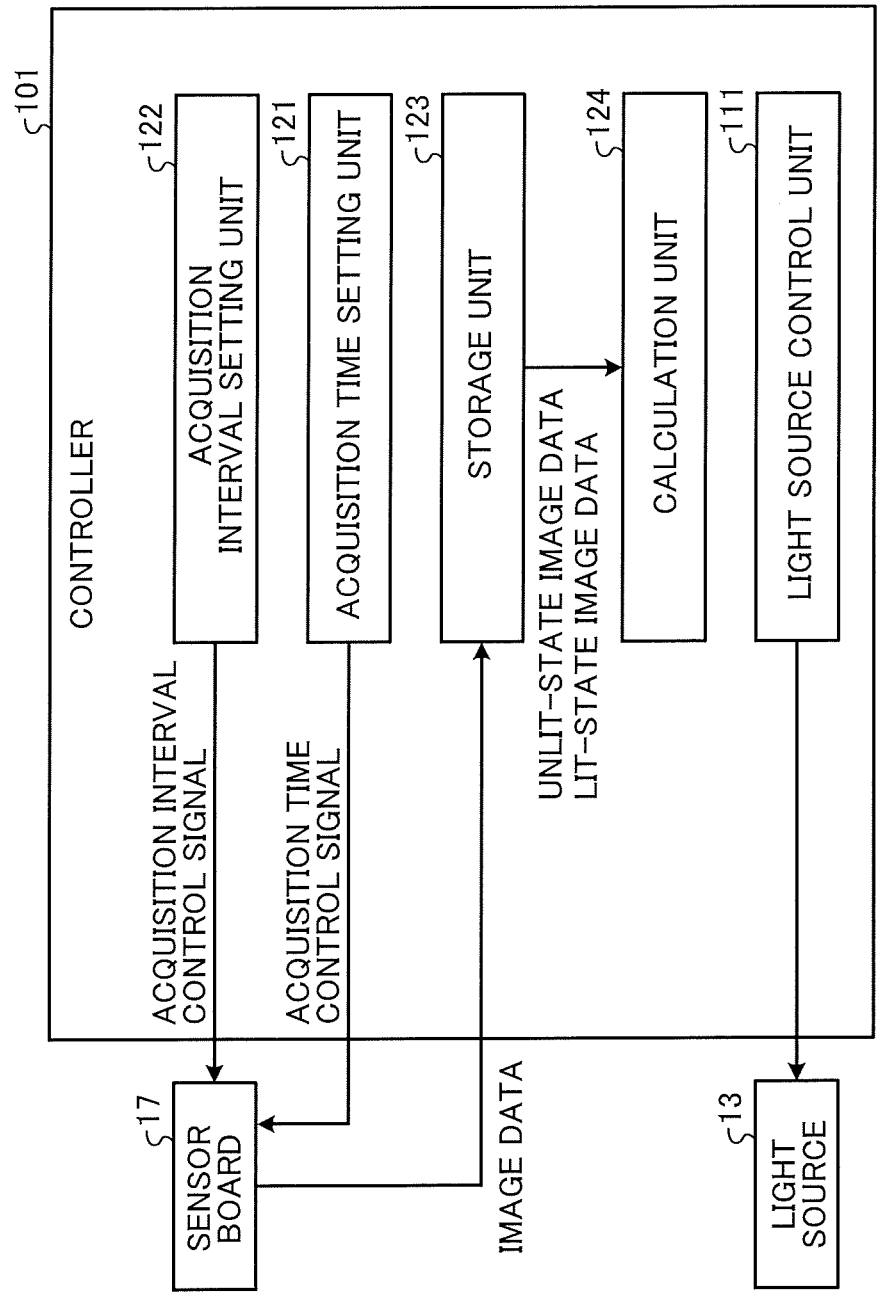
FIG. 2 is a block diagram illustrating an exemplary functional configuration of the reading device according to the first embodiment.

FIG. 2 is a block diagram illustrating an exemplary functional configuration of the reading device 1 according to the first embodiment. The reading device 1 includes a controller 101 that controls the light source 13 and the sensor board 17. The controller 101 includes a light source control unit 111, an acquisition time setting unit 121, an acquisition interval setting unit 122, a storage unit 123, and a calculation unit 124. The controller 101 is an electronic controller including one or a plurality of electronic circuits that executes predetermined processing, and implemented by cooperative operation of, for example, a central processing unit (CPU), a random access memory (RAM), a read only memory (ROM), a program that controls the CPU, various logic circuits, and the like.

The light source control unit 111 performs processing to control emission of the scanning light by the light source 13. The light source control unit 111 switches ON/OFF of the light source 13, adjusts a light amount of the scanning light, or the like in accordance with a predetermined control signal. The light source control unit 111 controls, for example, drive current to each LED included in the light source 13.

The acquisition time setting unit 121 performs processing to set an acquisition time. The acquisition time is a time during which the sensor board 17 continuously acquires image data. The acquisition time is, for example, a time to continuously acquire an electrical signal generated by a photoelectric conversion function of an imaging element included in the sensor board 17. The acquisition time is set based on a fluctuation cycle of disturbance light which may influence detection of a document size. A setting time may be preliminarily set or may be dynamically set. A method of setting the acquisition time will be described later. Note that the disturbance light is an exemplary fluctuation factor that may influence the detection of the document size. As a fluctuation factor other than the disturbance light, vibration of the reading device 1 itself, and the like may be considered, for example.

The acquisition interval setting unit 122 performs processing to set an acquisition interval. The acquisition interval is an interval generated during image data acquisition processing executed a plurality of times. In a case where the acquisition processing is executed the plurality of times at the time of detecting the document size, the acquisition time and the acquisition interval alternately come. A sum of the acquisition time and the acquisition interval will be referred to as a total time. The acquisition interval is set based on the fluctuation cycle of disturbance light which may influence the detection of the document size. The acquisition interval may be preliminarily set or may be dynamically set. A method of setting the acquisition interval will be described later.

The storage unit 123 stores the image data acquired by the sensor board 17. At this time, the sensor board 17 acquires, in one-time document size detection processing, unlit-state image data acquired in a state in which the scanning light (light source 13) is switched off and lit-state image data acquired in a state in which the scanning light is switched on. The storage unit 123 stores, in a correlated manner, the unlit-state image data and the lit-state image data associated with the same document size detection processing.

The calculation unit 124 calculates a difference between the unlit-state image data and the lit-state image data stored in the storage unit 123 and correlated to each other. Based on this difference, image data in which the influence of disturbance light is eliminated or reduced can be acquired. A method of using difference data indicating such a difference should not be particularly limited, but the difference data can be probably used in processing to identify a size of each document 21 as information in which the influence of the disturbance light is eliminated or reduced.

Exemplary Setting of Acquisition Time and Acquisition Interval

Case of Handling One Kind of Fluctuation Cycle

Exemplary settings of an acquisition time and an acquisition interval in a case of handling one kind of fluctuation cycle of disturbance light will be described below as first to third exemplary settings.

Figure 3:
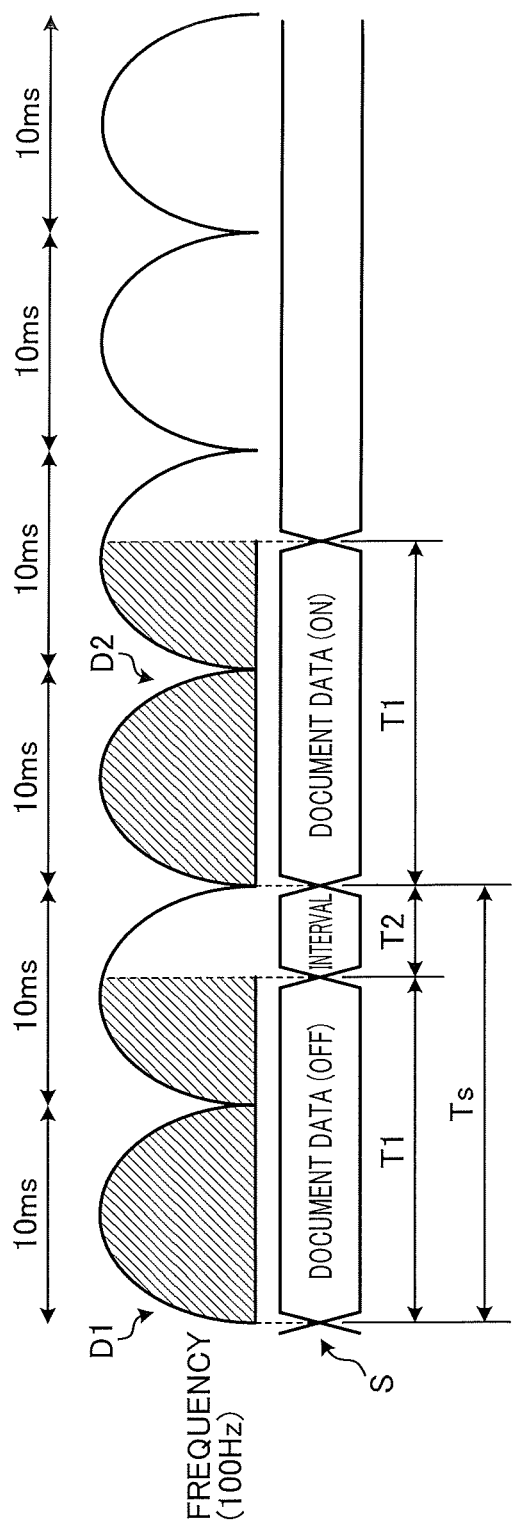
FIG. 3 is a diagram illustrating an exemplary acquisition time and an exemplary acquisition interval according to a first exemplary setting of the first embodiment.

FIG. 3 is a diagram illustrating an exemplary acquisition time T1 and an exemplary acquisition interval T2 according to the first exemplary setting of the first embodiment. Disturbance light exemplified here is light that repeatedly blinks at a frequency of 100 Hz, that is, in a fluctuation cycle of 10 ms. The disturbance light has intensity that fluctuates in a wave-like form as illustrated in FIG. 3.

In the first exemplary setting, a total time Ts that is a sum of an acquisition time T1 and an acquisition interval T2 is double (20 ms) the fluctuation cycle of the disturbance light. FIG. 3 illustrates unlit-state image data D1 (image data obtained in the state in which the scanning light is switched off) and lit-state image data D2 (image data obtained in the state in which the scanning light is switched on) in each of two acquisition times T1. Thus, when the total time Ts is set to an integer multiple of the fluctuation cycle, an integral value of a data level of the unlit-state image data D1 and an integral value of a data level of the lit-state image data D2 can be made substantially constant. Consequently, it is possible to accurately grasp and eliminate the influence by the disturbance light that fluctuates cyclically.

Note that a numerical value "double" is an example of the "integer multiple", and the total time Ts may be an integer multiple other than double the fluctuation cycle (for example, one time, three times the fluctuation cycle, or the like). Additionally, FIG. 3 illustrates the case where a start point S of the acquisition time T1 is synchronized with a switch-off point of the disturbance light (when the intensity of the disturbance light becomes 0), but the embodiment is not limited thereto.

Figure 4:
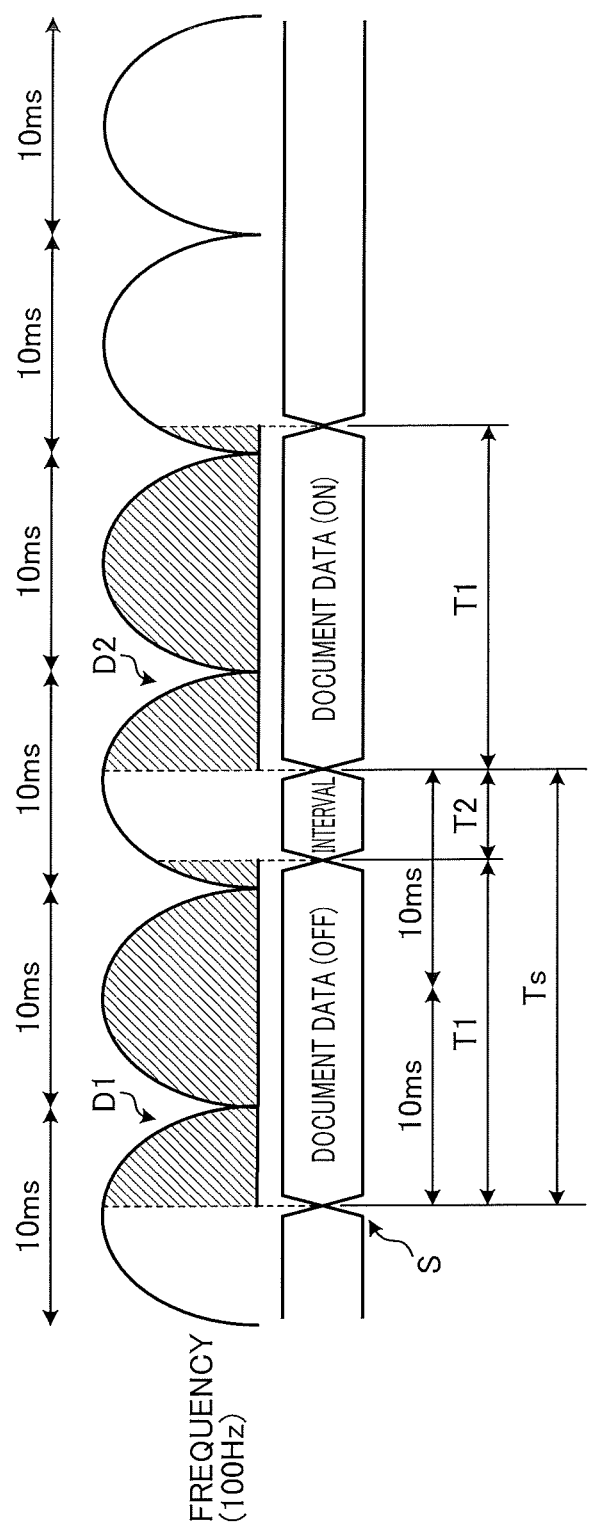
FIG. 4 is a diagram illustrating an exemplary case where a start point of the acquisition time is included in a lit period of disturbance light in the first exemplary setting of the first embodiment.

FIG. 4 is a diagram illustrating an exemplary case where the start point S of the acquisition time T1 is included in a lit period of the disturbance light in the first exemplary setting of the first embodiment. Thus, even in a case where the start point S of the acquisition time T1 is not synchronized with the switch-off point of the disturbance light, as far as the total time Ts is set to the integer multiple of the fluctuation cycle, the integral value of the data level of the unlit-state image data D1 and the integral value of the data level of the lit-state image data D2 become substantially constant. Consequently, an effect similar to the case of FIG. 3 can be obtained.

Figure 5:
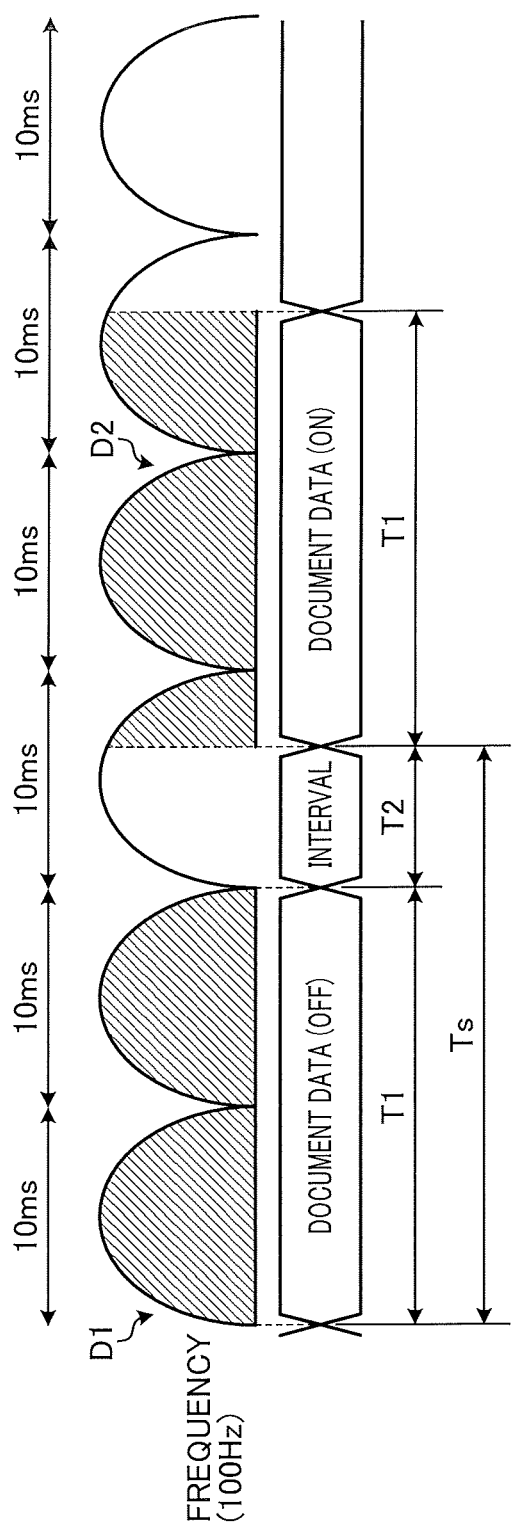
FIG. 5 is a diagram illustrating an exemplary acquisition time and an exemplary acquisition interval according to a second exemplary setting of the first embodiment.

FIG. 5 is a diagram illustrating an exemplary acquisition time T1 and an exemplary acquisition interval T2 according to a second exemplary setting of the first embodiment. In the second exemplary setting, the acquisition time T1 is double (20 ms) the fluctuation cycle of the disturbance light. Thus, when the acquisition time T1 is set to an integer multiple of the fluctuation cycle, the integral value of the data level of the unlit-state image data D1 and the integral value of the data level of the lit-state image data D2 can be made substantially constant, similarly to the first example illustrated in FIG. 3.

Figure 6:
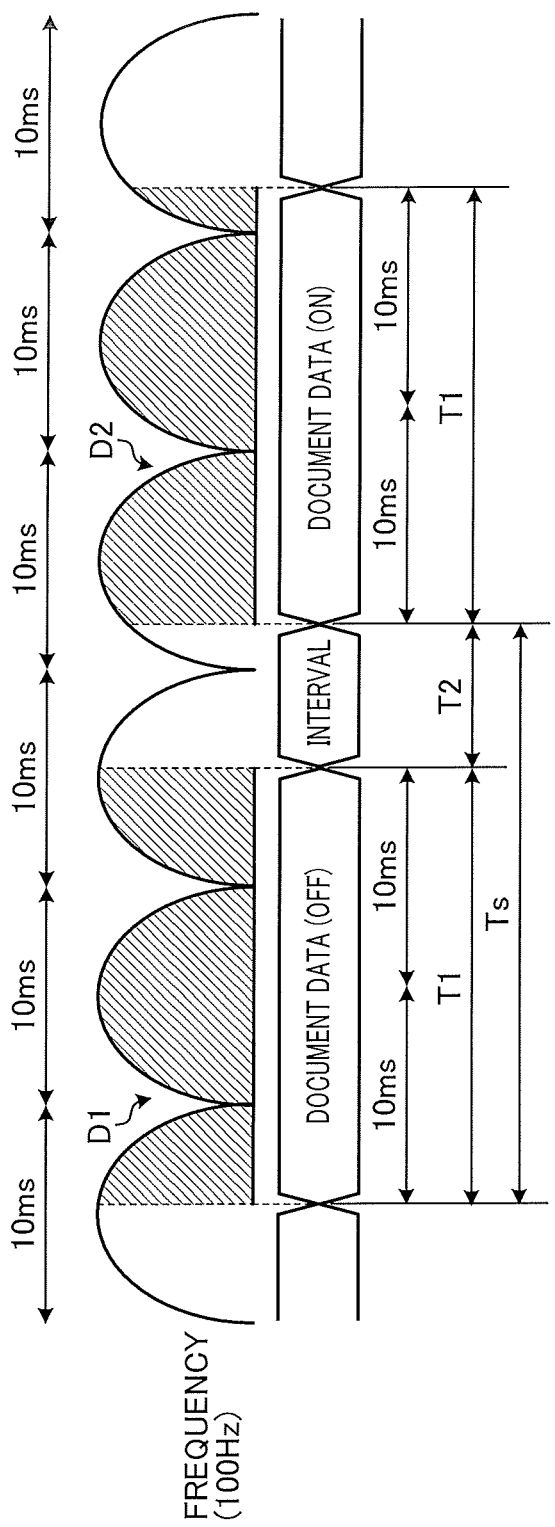
FIG. 6 is a diagram illustrating an exemplary case where a start point of the acquisition time is included in the lit period of the disturbance light in the second exemplary setting of the first embodiment.

FIG. 6 is a diagram illustrating an exemplary case where the start point S of the acquisition time T1 is included in the lit period of the disturbance light in the second exemplary setting of the first embodiment. Thus, even in a case where the start point S of the acquisition time T1 is not synchronized with the switch-off point of the disturbance light, as far as the acquisition time T1 is set to the integer multiple of the fluctuation cycle, the integral value of the data level of the unlit-state image data D1 and the integral value of the data level of the lit-state image data D2 become substantially constant. Consequently, an effect similar to the case of FIG. 5 can be obtained.

Figure 7:
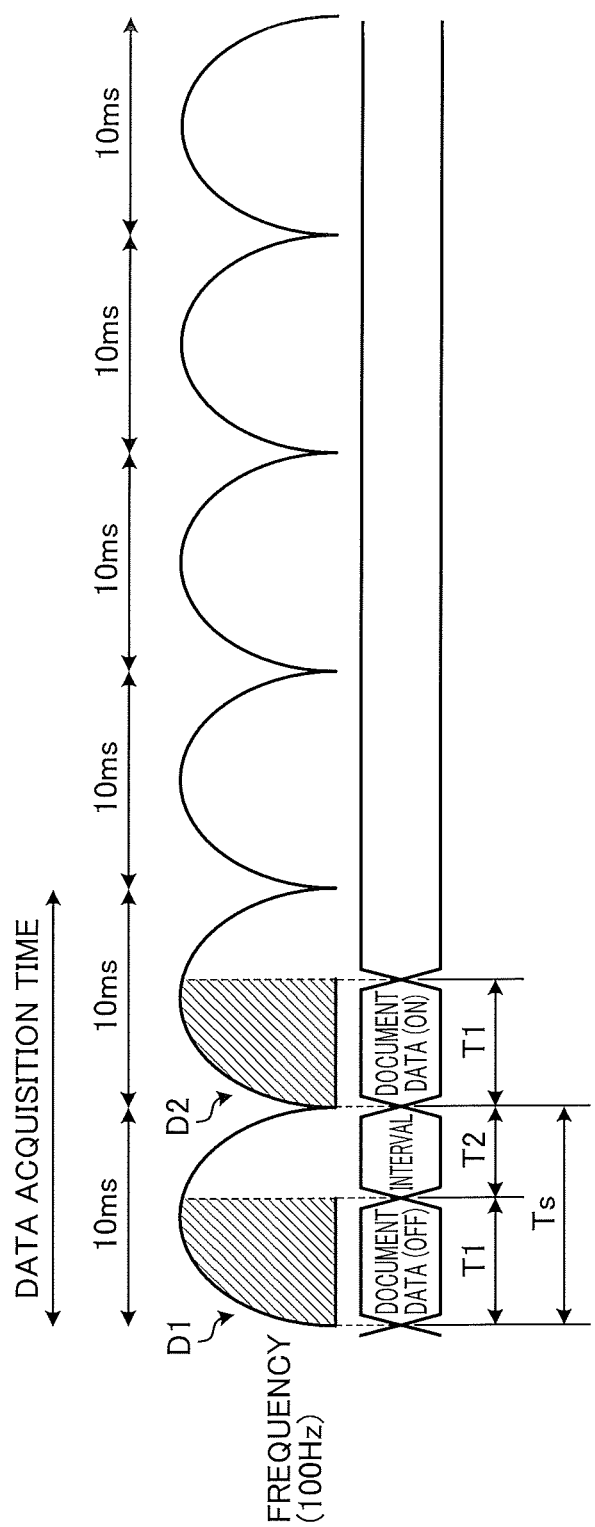
FIG. 7 is a diagram illustrating an exemplary acquisition time and an exemplary acquisition interval according to a third exemplary setting of the first embodiment.

FIG. 7 is a diagram illustrating an exemplary acquisition time T1 and an exemplary acquisition interval T2 according to a third exemplary setting of the first embodiment. In the third exemplary setting, a total time Ts that is a sum of the acquisition time T1 and the acquisition interval T2 corresponds to one cycle (10 ms) of the fluctuation cycle of the disturbance light. With this setting, it is possible to suppress, to a minimum time (corresponding to two cycles), a time (data acquisition time) required to acquire the unlit-state image data D1 and the lit-state image data D2 which are needed in the size detection processing.

Figure 8:
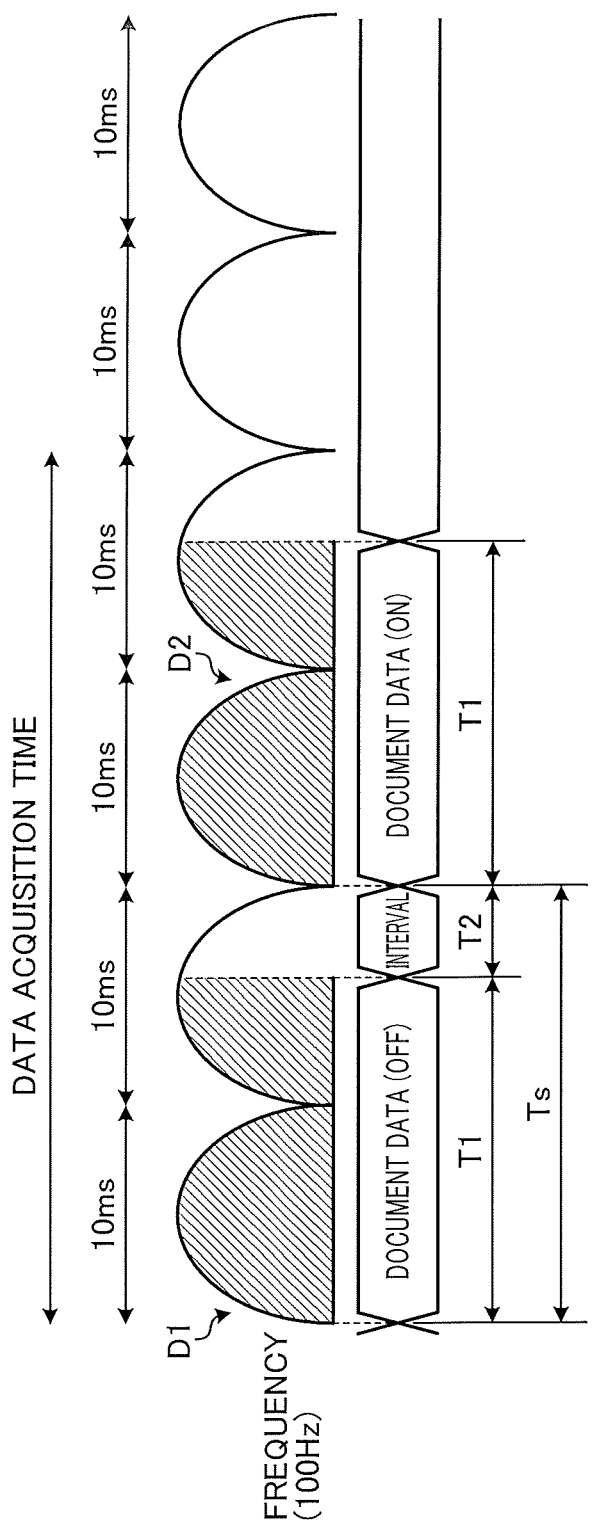
FIG. 8 is a diagram illustrating an exemplary acquisition time and an exemplary acquisition interval according to a first comparative example.

FIG. 8 is a diagram illustrating an exemplary acquisition time T1 and an exemplary acquisition interval T2 according to a first comparative example. A total time Ts according to this comparative example corresponds to two cycles (20 ms) of the fluctuation cycle of the disturbance light. In this case, a data acquisition time corresponds to four cycles (40 ms) that is longer than the data acquisition time in the case illustrated in FIG. 7.

Since the size detection processing is normally executed before the image reading processing, it is possible to accelerate the size detection processing and the image reading processing by shortening the data acquisition time like the present exemplary setting.

Case of Handling Two Kinds of Fluctuation Cycles

In the following, exemplary settings of an acquisition time and an acquisition interval in a case of handling two kinds of fluctuation cycles of the disturbance light will be described as fourth to sixth exemplary settings.

Figure 9:
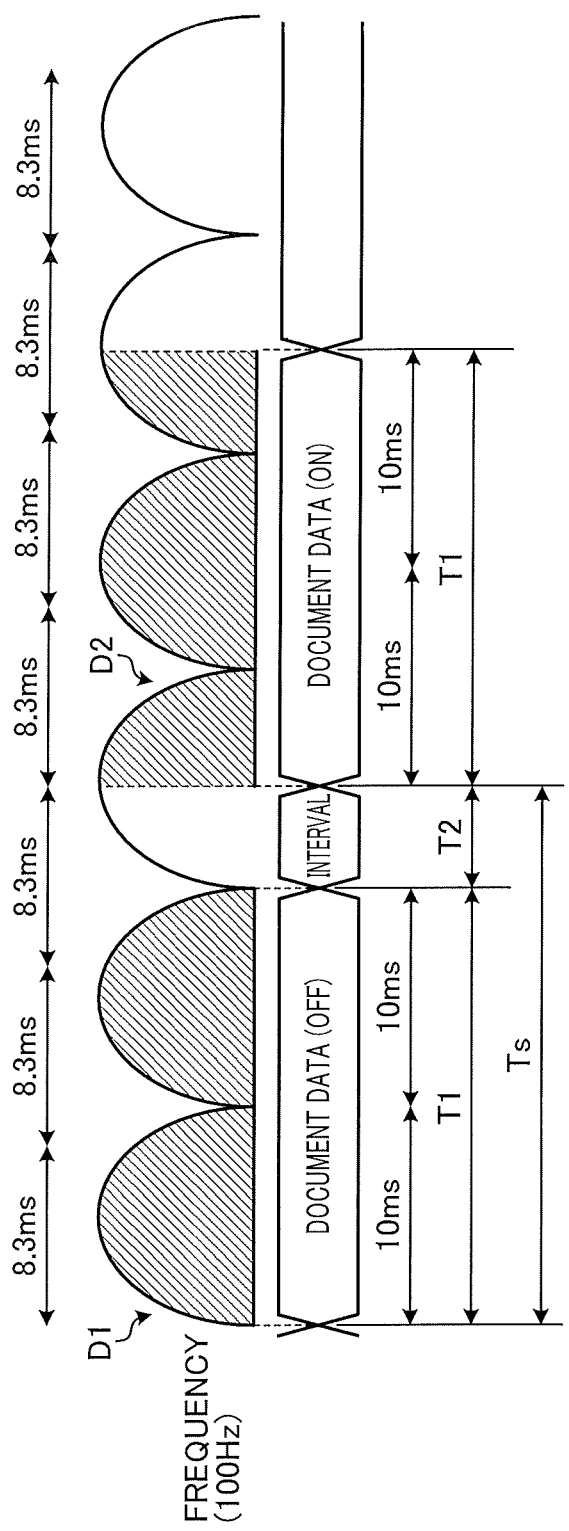
FIG. 9 is a diagram illustrating an exemplary acquisition time and an exemplary acquisition interval while using first disturbance light as a reference according to a fourth exemplary setting of the first embodiment.
Figure 10:
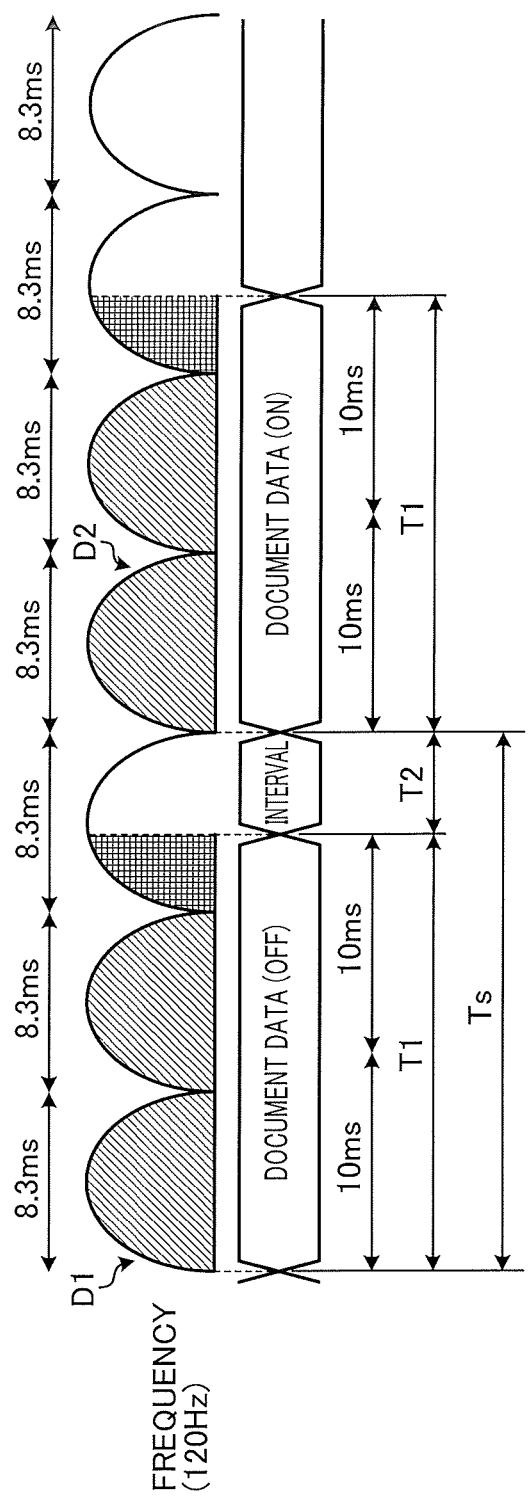
FIG. 10 is a diagram illustrating an exemplary acquisition time and an exemplary acquisition interval while using second disturbance light as a reference according to the fourth exemplary setting of the first embodiment.

FIG. 9 is a diagram illustrating an exemplary acquisition time T1 and an exemplary acquisition interval T2 while using first disturbance light as a reference according to the fourth exemplary setting of the first embodiment. FIG. 10 is a diagram illustrating an exemplary acquisition time T1 and an exemplary acquisition interval T2 while using second disturbance light as a reference according to the fourth exemplary setting of the first embodiment. The first disturbance light is light that repeatedly blinks at a frequency of 100 Hz, that is, in a fluctuation cycle of 10 ms. The second disturbance light is light that repeatedly blinks at a frequency of 120 Hz, that is, in a fluctuation cycle of approximately 8.3 ms.

In the fourth exemplary setting, as illustrated in FIGS. 9 and 10, the acquisition time T1 corresponds to two cycles (20 ms) of the fluctuation cycle of the first disturbance light, and a total time Ts of the acquisition time T1 and the acquisition interval T2 corresponds to three cycles (approximately 25 ms) of the fluctuation cycle of the second disturbance light. Thus, in a case where there are two kinds of frequencies (fluctuation cycles) of the disturbance light, the acquisition time T1 is set to an integer multiple of one kind of the fluctuation cycles, and the total time Ts is set to an integer multiple of the other kind of the fluctuation cycles. Consequently, influence of the two kinds of the disturbance light can be reduced.

Note that, the example described here is the exemplary case where the acquisition time T1 is made to correspond to the fluctuation cycle of 10 ms of the first disturbance light, and the total time Ts is made to correspond to the fluctuation cycle of approximately 8.3 ms of the second disturbance light. However, the acquisition time T1 may be made to correspond to the fluctuation cycle of approximately 8.3 ms of the second disturbance light, and the total time Ts may be made to correspond to the fluctuation cycle of 10 ms of the first disturbance light.

Figure 11:
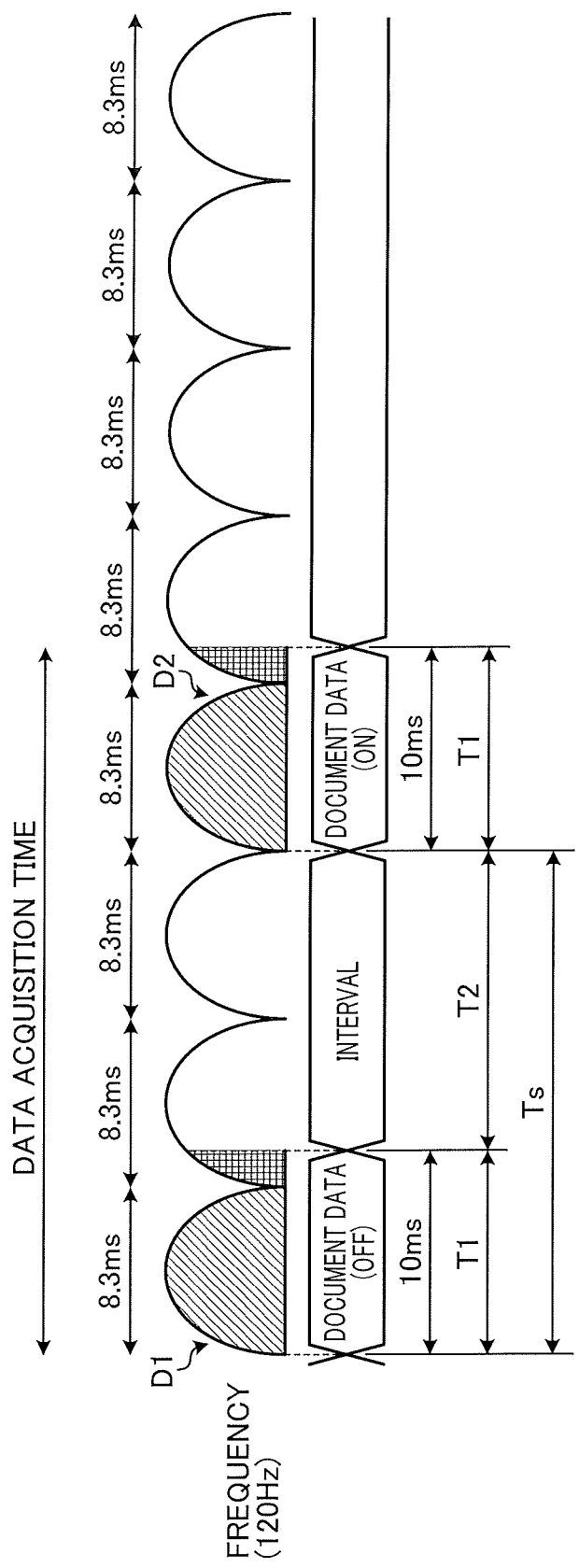
FIG. 11 is a diagram illustrating an exemplary acquisition time and an exemplary acquisition interval according to a fifth exemplary setting of the first embodiment.

FIG. 11 is a diagram illustrating an exemplary acquisition time T1 and an exemplary acquisition interval T2 according to the fifth exemplary setting of the first embodiment. In the fifth exemplary setting, the acquisition time T1 corresponds to one cycle (10 ms) of the fluctuation cycle of the first disturbance light, and the total time Ts corresponds to three cycles (approximately 25 ms) of the fluctuation cycle of the second disturbance light. With this setting, the data acquisition time can be suppressed to a short time (approximately 35 ms in the present example).

Figure 12:
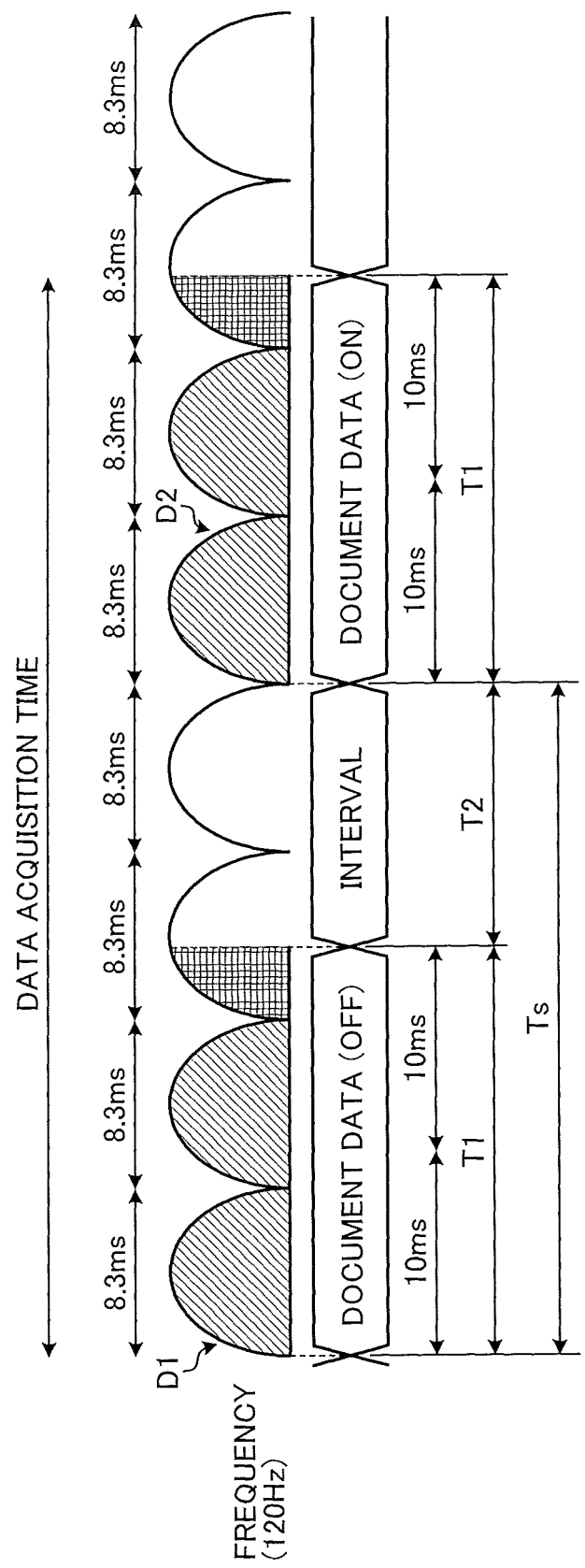
FIG. 12 is a diagram illustrating an exemplary acquisition time and an exemplary acquisition interval according to a second comparative example.

FIG. 12 is a diagram illustrating an exemplary acquisition time T1 and an exemplary acquisition interval T2 according to a second comparative example. The acquisition time T1 according to the present comparative example corresponds to two cycles (20 ms) of the fluctuation cycle of first disturbance light, and a total time Ts is four cycles (approximately 33.3 ms) of the fluctuation cycle of second disturbance light. In this case, the data acquisition time is approximately 53.3 ms that is longer than the data acquisition time in the case illustrated in FIG. 11.

Thus, according to the present exemplary setting, even in the case where there are the two kinds of fluctuation cycles, it is possible to shorten the data acquisition time and accelerate the size detection processing and the image reading processing.

Figure 13:
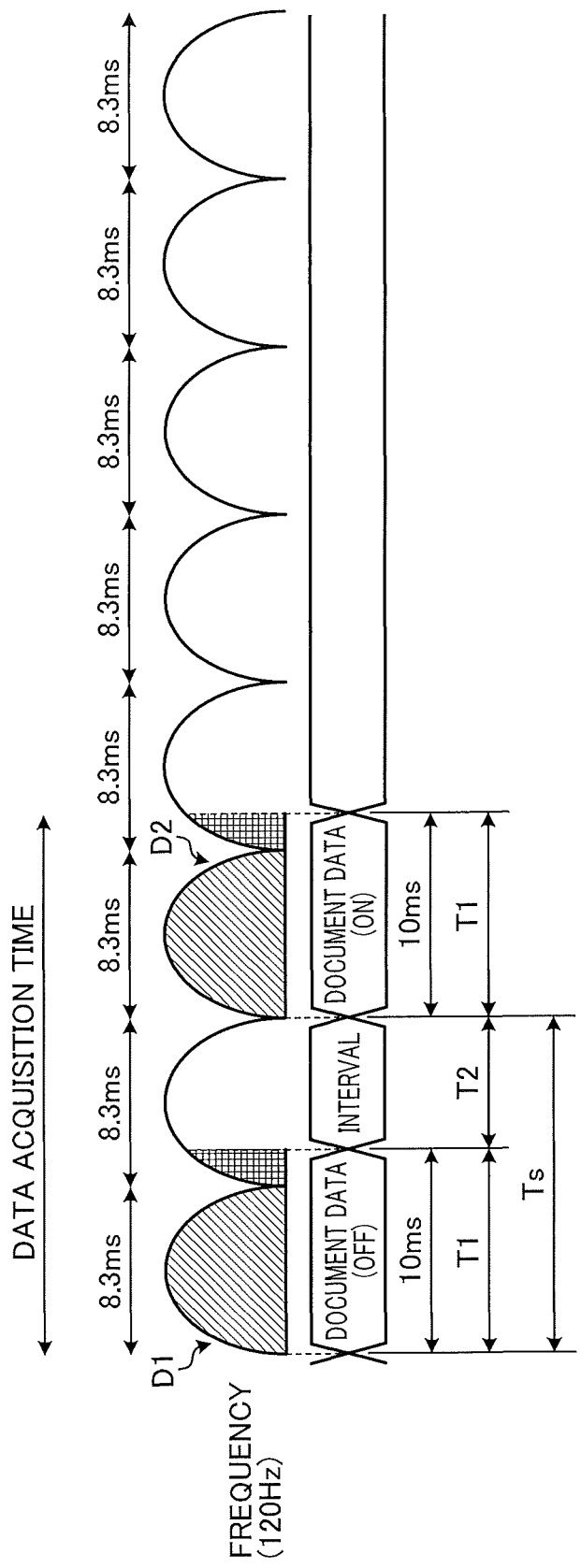
FIG. 13 is a diagram illustrating an exemplary acquisition time and an exemplary acquisition interval according to a sixth exemplary setting of the first embodiment.

FIG. 13 is a diagram illustrating an exemplary acquisition time T1 and an exemplary acquisition interval T2 according to the sixth exemplary setting of the first embodiment. In the sixth exemplary setting, the acquisition time T1 corresponds to one cycle (10 ms) of the fluctuation cycle of the first disturbance light, and the acquisition interval T2 corresponds to one cycle (approximately 8.3 ms) or less of the fluctuation cycle of the second disturbance light. With this setting, the data acquisition time can be minimized (to approximate 26.7 ms in the present example), and more acceleration than in the case illustrated in FIG. 11 is achieved.

Regarding Acquisition Order of Image Data

As described above, the unlit-state image data and the lit-state image data are acquired in the present embodiment, and the unlit-state image data is preferably acquired prior to the lit-state image data. There are many cases where the light source 13 that emits the scanning light requires a stabilization time until the state is stabilized at the time of ON/OFF switching. Considering such a situation, the unlit-state image data is acquired prior to the lit-state image data. Consequently, the unlit-state image data can be acquired without waiting for the stabilization time after switching off the light source 13.

Figure 14:
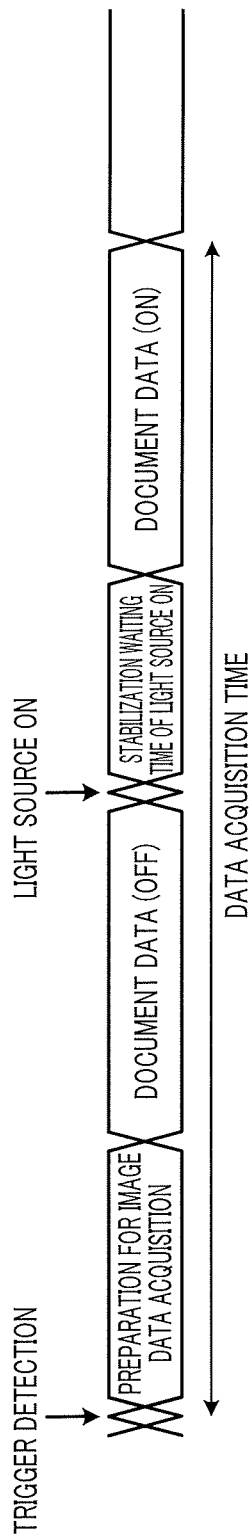
FIG. 14 is a diagram illustrating exemplary acquisition order of image data according to the first embodiment.

FIG. 14 is a diagram illustrating exemplary acquisition order of image data according to the first embodiment. In the present embodiment, when a trigger to start the size detection processing (for example, a case where an angle between the contact glass 11 and the background portion 45 of the ADF 20 meets a predetermined condition) is detected, preparation for image data acquisition is performed and the unlit-state image data D1 is acquired in a state that the light source 13 is switched off after completion of the preparation for image data acquisition. After completion of the acquisition of the unlit-state image data D1, the light source 13 is switched on, and the lit-state image data D2 is acquired after elapse of the stabilization time of the ON state of the light source.

Figure 15:
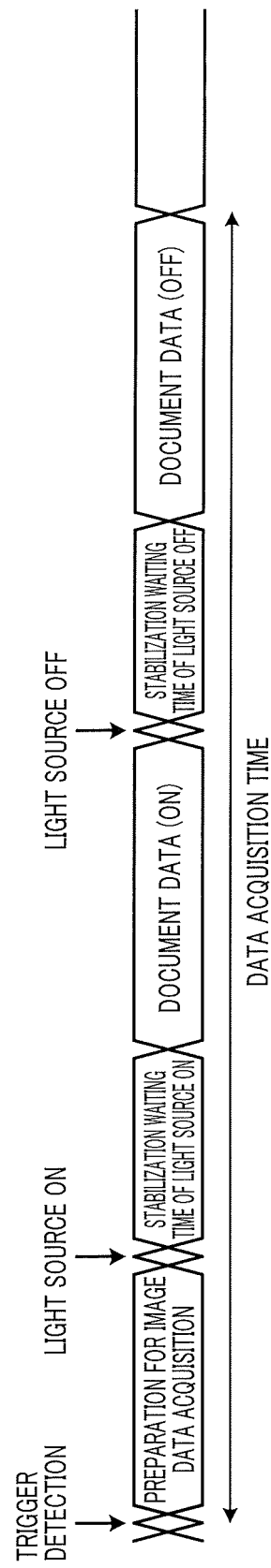
FIG. 15 is a diagram illustrating exemplary acquisition order of image data according to a third comparative example.

FIG. 15 is a diagram illustrating exemplary acquisition order of image data according to a third comparative example. In the present comparative example, the light source 13 is switched on after completion of the preparation for image data acquisition, and the lit-state image data D2 is acquired after elapse of the stabilization time of the ON state of the light source. Then, the light source 13 is switched off after the completion of the acquisition of the lit-state image data D2, and the unlit-state image data D1 is acquired after elapse of the stabilization time of the OFF state of the light source.

As described above, in the comparative example, both of the stabilization time of the ON state of the light source and the stabilization time of the OFF state of the light source are included in a period of acquiring the two kinds of the image data D1 and D2. However, according to the present embodiment, the stabilization time of the OFF state of the light source is not included in the period of acquiring the two kinds of image data D1 and D2. Consequently, the data acquisition time in the present embodiment is shortened more than the data acquisition time in the comparative example.

Document Size Detecting Position

Figure 16:
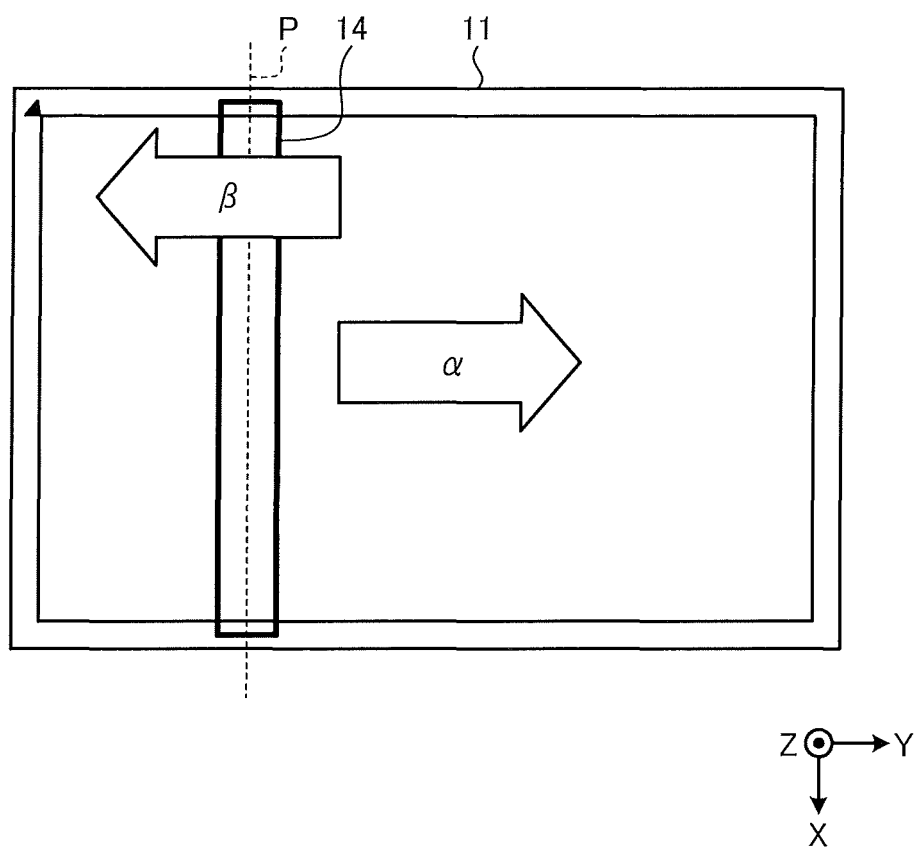
FIG. 16 is a view illustrating exemplary movement of a first carriage according to the first embodiment.

FIG. 16 is a view illustrating exemplary movement of the first carriage 14 according to the first embodiment. As illustrated in FIG. 16, when the size detection processing is executed (when a size in the main-scanning direction (X-axis direction) of each document 21 is detected), the first carriage 14 may be moved from a predetermined start position Pin a moving direction β opposite to a moving direction α at the time of executing the image reading processing. Note that the first carriage 14 may also be moved in a direction same as the moving direction α at the time of executing the image reading processing when the size detection processing is executed.

Configuration of Image Forming Apparatus

Figure 17:
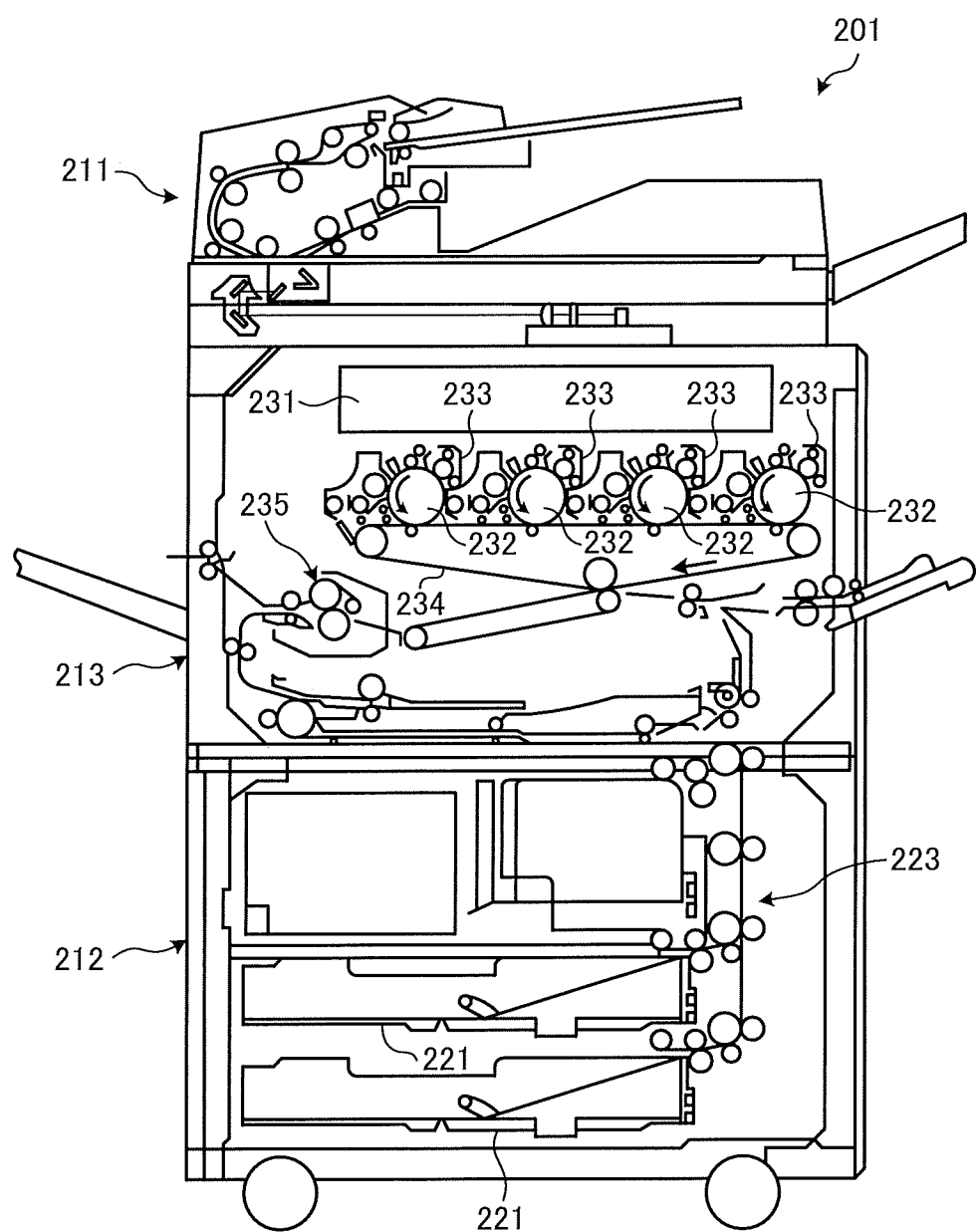
FIG. 17 is a view illustrating an exemplary configuration of a copy machine according to the first embodiment.

FIG. 17 is a view illustrating an exemplary configuration of a copy machine 201 according to the first embodiment. The copy machine 201 is an exemplary image forming apparatus including an image reading device 211, which is implemented by the reading device 1. The copy machine 201 includes the image reading device 211, a sheet feeder 212, and an image forming device 213.

The image reading device 211 reads an image of each document 21 based on image data acquired by the sensor board 17.

The sheet feeder 212 includes: sheet feeding cassettes 221 and 222 storing recording sheets (recording media) of different sizes, and a sheet feeder 223 including various kinds of rollers that convey the recording sheets stored in the sheet feeding cassettes 221 and 222 to an image forming position of the image forming device 213.

The image forming device 213 includes an exposure device 231, a photoconductor drum 232, a developing device 233, a transfer belt 234, and a fixing device 235. The image forming device 213 exposes the photoconductor drum 232 by the exposure device 231 based on image data of the document 21 read by the image reading device 211 to form a latent image on the photoconductor drum 232, and toners of different colors are supplied to the photoconductor drum 232 by the developing device 233 so as to perform development. Subsequently, the image forming device 213 transfers the image developed on the photoconductor drum 232 by the transfer belt 234 onto a recording sheet fed from the sheet feeder 212, and then the toner of the toner image transferred onto the recording sheet is melted and a color image is fixed on the recording sheet by the fixing device 235.

As described above, according to the present embodiment, it is possible to reduce the influence of the fluctuation factor such as the disturbance light that fluctuates cyclically.

In the following, other embodiments will be described with reference to the drawings, but components/units having functions and effects same as or similar to the components/units of the first embodiment may be denoted by the same reference signs, and descriptions of other embodiments may be omitted.

Second Embodiment

Light of a fluorescent lamp that is general disturbance light blinks in a cycle dependent on a frequency of a public AC power supply, but the disturbance light that blinks in a cycle not dependent on the AC power supply may influence size detection processing. Accordingly, in the present embodiment, a frequency of the disturbance light is detected, and an acquisition time and an acquisition interval are set in accordance with the detected frequency.

Figure 18:
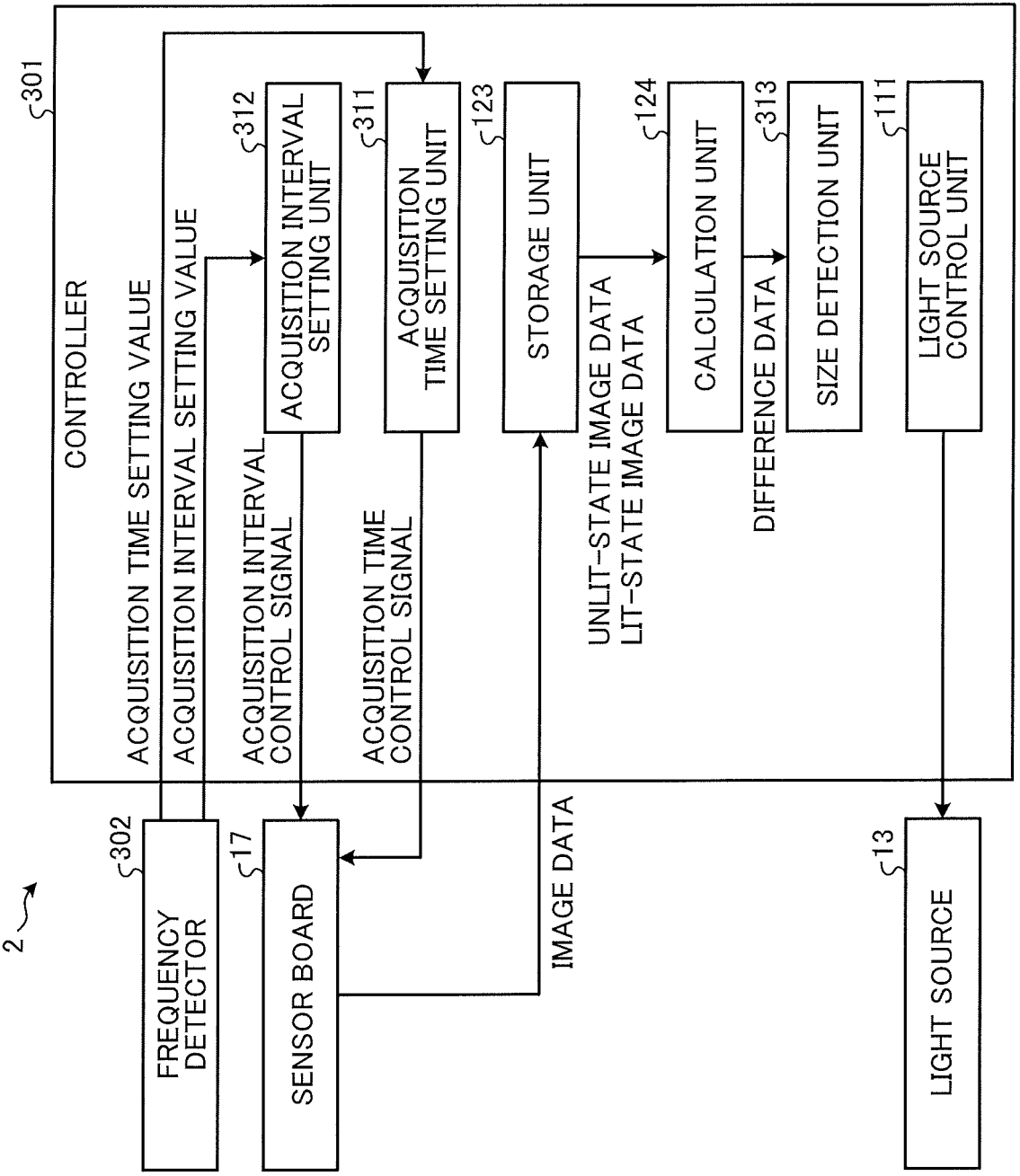
FIG. 18 is a block diagram illustrating an exemplary functional configuration of a reading device according to a second embodiment.

FIG. 18 is a block diagram illustrating an exemplary functional configuration of a reading device 2 according to a second embodiment. The reading device 2 of FIG. 18 is substantially similar in function to the reading device 1 of FIG. 2, except that the controller 101 is replaced by a controller 301, and a frequency detector 302 is additionally provided. The frequency detector 302 detects a frequency of the disturbance light (fluctuation cycle) and outputs an acquisition time setting value and an acquisition interval setting value based on the detection result. A specific configuration of the frequency detector 302 should not be particularly limited, but the frequency detector 302 can be implemented by using, for example, a photoelectric conversion element that is installed inside or outside the reading device 2 and converts intensity of the disturbance light into voltage.

The controller 301 includes an acquisition time setting unit 311, an acquisition interval setting unit 312, the storage unit 123, the calculation unit 124, a size detection unit 313, and the light source control unit 111.

The acquisition time setting unit 311 of the controller 301 according to the present embodiment sets an acquisition time based on the acquisition time setting value output from the frequency detector 302 and outputs, to the sensor board 17, an acquisition time control signal indicating the set acquisition time. The acquisition interval setting unit 312 sets an acquisition interval based on the acquisition interval setting value output from the frequency detector 302, and outputs, to the sensor board 17, an acquisition interval control signal indicating the set acquisition interval. The sensor board 17 acquires image data (unlit-state image data and lit-state image data) during the acquisition time and the acquisition interval indicated by the received acquisition time control signal and the received acquisition interval control signal respectively.

Figure 19:
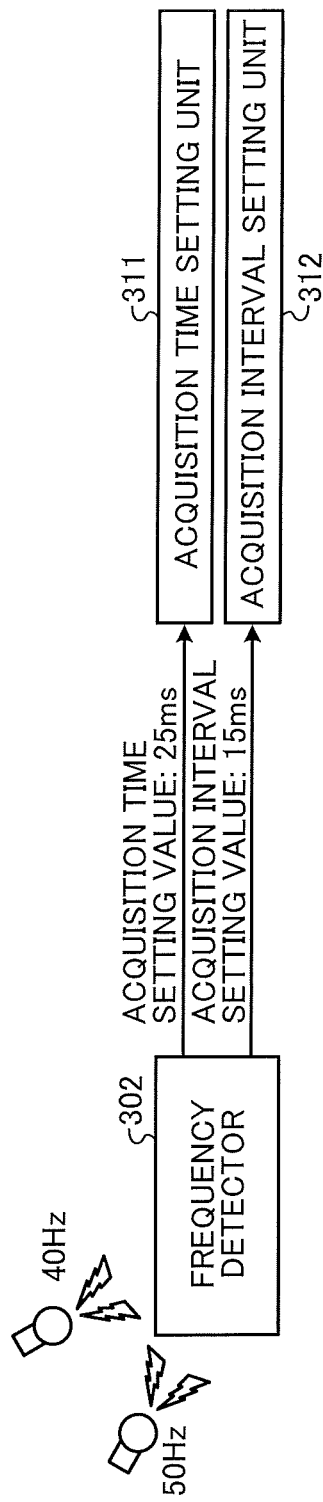
FIG. 19 is a diagram illustrating an exemplary acquisition time setting value and an exemplary acquisition interval setting value output by a frequency detector according to the second embodiment.

FIG. 19 is a diagram illustrating an exemplary acquisition time setting value and an exemplary acquisition interval setting value output from the frequency detector 302 according to the second embodiment. Here, a case where there are two kinds of disturbance light respectively having a frequency of 40 Hz and a frequency of 50 Hz will be exemplified. In this case, the frequency detector 302 sets, for example, the acquisition time setting value to 25 ms that is an integer multiple of (one time) a 40 Hz cycle. Additionally, the frequency detector 302 sets the acquisition interval setting value to 15 ms such that a total time becomes ms that is an integer multiple of (double) a cycle of 50 Hz. Note that the acquisition time setting value and the acquisition interval setting value illustrated here are merely examples, and the acquisition time setting value and the acquisition interval setting value can be appropriately set in accordance with a situation as described in various exemplary settings of a first embodiment.

Furthermore, as illustrated in FIG. 18, the controller 301 according to the present embodiment includes a size detection unit 313. The size detection unit 313 executes processing to detect an entire size of each document 21 (e.g., A4, B5, and the like) based on a calculation result by a calculation unit 124, that is, a difference data indicating a difference between unlit-state image data and lit-state image data.

According to the present embodiment, in a case where a frequency (fluctuation cycle) that is a fluctuation factor such as the disturbance light is not a general fixed value, influence of the fluctuation factor is effectively eliminated even in a case where the frequency is changed.

Third Embodiment

Figure 20:
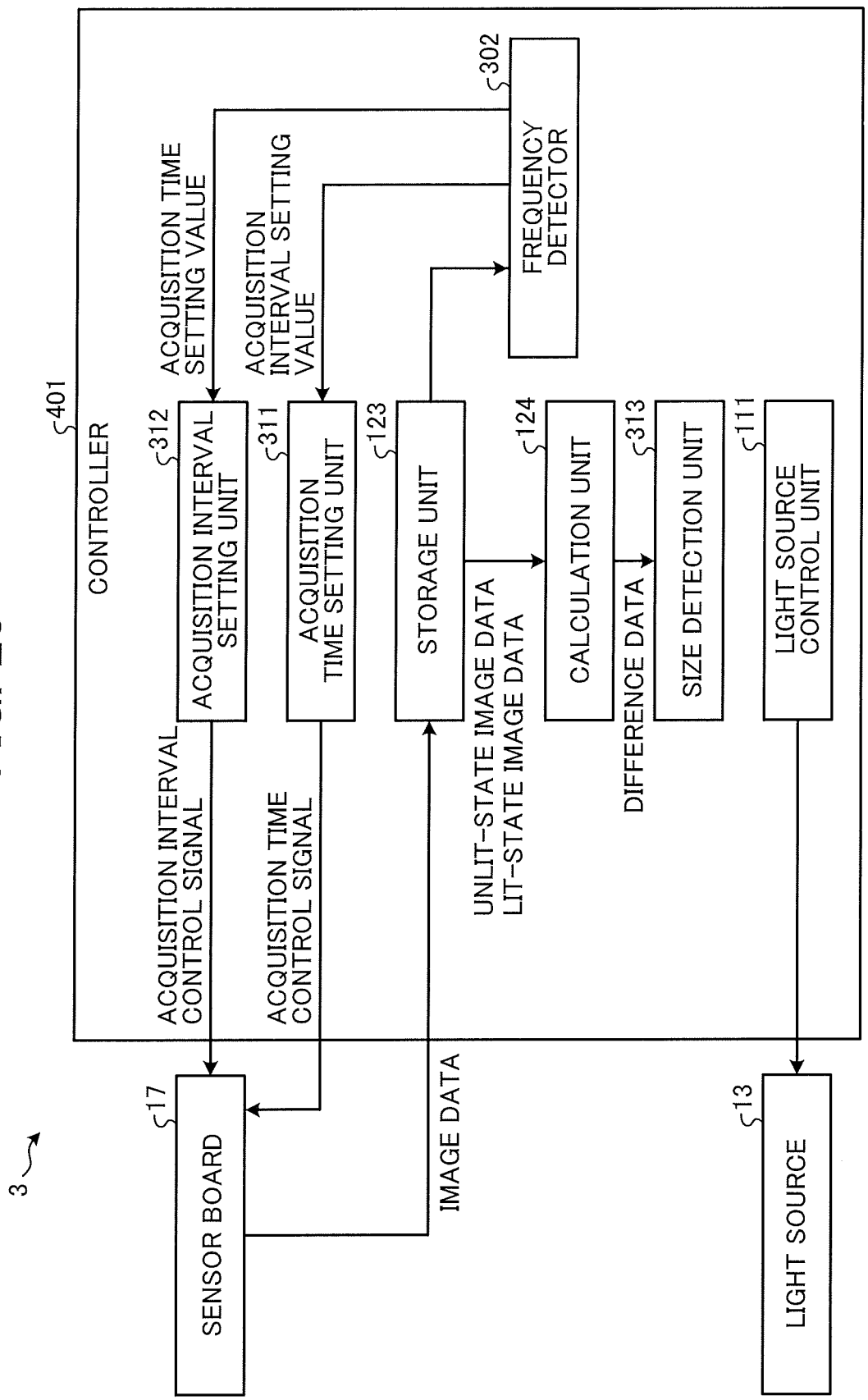
FIG. 20 is a block diagram illustrating an exemplary functional configuration of a reading device according to a third embodiment.

FIG. 20 is a block diagram illustrating an exemplary functional configuration of a reading device 3 according to a third embodiment. The reading device 3 of FIG. 20 is substantially similar in function to the reading device 2 of FIG. 18, except that the controller 101 is replaced by a controller 401, and the frequency detector 302 is provided in the controller 401. The frequency detector 302 according to the present embodiment detects a frequency of disturbance light based on image data stored in a storage unit 123. For example, the frequency of the disturbance light can be detected by comparing, per line, the image data stored in the storage unit 123 and calculating a cycle of increase and decrease of an image data level. Additionally, a sensor board 17 preferably acquires unlit-state image data at the timing when a background portion 45 is opened (when an angle between a contact glass 11 and the background portion 45 becomes a predetermined angle or more from 0°).

According to the present embodiment, the frequency detector 302 can be provided as software, and downsizing of a device, cost reduction, and the like can be achieved.

Each of programs that implement functions of the reading devices 1 to 3 according to the above embodiments may be provided as a file in an installable format or an executable format by being recorded in a computer-readable recording medium such as a compact disc read only memory (CD-ROM), a flexible disk (FD), a compact disc recordable (CD-R), or a digital versatile disk (DVD). Alternatively, each of the programs may be stored on another computer connected to a network such as the Internet, and may be provided by being downloaded via the network. Also, each of the programs may be provided or distributed via the network.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reading device comprising:
a light source configured to irradiate a subject with scanning light;
a light receiver configured to receive reflection light from the subject; and
circuitry configured to:
control the light source to switch on and off of the scanning light;
control the light receiver to receive the reflection light from the subject for a predetermined acquisition time at a predetermined acquisition interval so as to acquire data; and
calculate a difference between the data acquired while the scanning light is switched on and the data acquired while the scanning light is switched off,
wherein the predetermined acquisition time and the predetermined acquisition interval are set such that the acquisition time or a total time of the acquisition time and the acquisition interval become an integer multiple of a fluctuation cycle of a fluctuation factor.

2. The reading device according to claim 1,
wherein the total time includes one cycle of the fluctuation cycle.

3. The reading device according to claim 1,
wherein the acquisition time includes an integer multiple of a first fluctuation cycle, and
the total time includes an integer multiple of a second fluctuation cycle.

4. The reading device according to claim 1,
wherein the acquisition time includes one cycle of a first fluctuation cycle, and
the total time includes an integer multiple of a second fluctuation cycle.

5. The reading device according to claim 1,
wherein the acquisition time includes one cycle of a first fluctuation cycle, and
the acquisition interval includes one cycle or less of a second fluctuation cycle.

6. The reading device according to claim 1,
wherein the light receiver acquires the data while the light is switched off before the data while the light is switched on.

7. The reading device according to claim 1,
wherein the circuitry detects a size of the subject based on the difference calculated from data acquired by the light receiver during a period to detect the size of the subject.

8. The reading device according to claim 1,
wherein the circuitry detects the fluctuation cycle, and sets the acquisition time and the acquisition interval based on the detected fluctuation cycle.

9. The reading device according to claim 8,
wherein the circuitry detects the fluctuation cycle based on data acquired by the light receiver.

10. The reading device according to claim 1,
wherein the fluctuation cycle of the fluctuation factor is a fluctuation cycle of disturbance light that may influence detection of a size of the subject.

11. The reading device according to claim 1,
wherein the circuitry reads an image of the subject based on the data acquired by the light receiver.

12. An image forming apparatus comprising:
the reading device according to claim 11; and
an image forming device configured to form, on a recording medium, the image read by the reading device.

13. A reading method comprising:
irradiating a subject with scanning light from a light source;

receiving reflection light from the subject for a predetermined acquisition time at a predetermined acquisition interval to acquire image data of the subject; and calculating a difference between the data acquired while the scanning light is switched on and the data acquired while the scanning light is switched off, wherein the predetermined acquisition time and the predetermined acquisition interval are set such that the acquisition time or a total time of the acquisition time and the acquisition interval become an integer multiple of a fluctuation cycle of a fluctuation factor.

14. A non-transitory recording medium which, when executed by one or more processors, cause the processors to perform reading method comprising:

irradiating a subject with scanning light from a light source;

receiving reflection light from the subject for a predetermined acquisition time at a predetermined acquisition interval to acquire image data of the subject; and calculating a difference between the data acquired while the scanning light is switched on and the data acquired while the scanning light is switched off, wherein the predetermined acquisition time and the predetermined acquisition interval are set such that the acquisition time or a total time of the acquisition time and the acquisition interval become an integer multiple of a fluctuation cycle of a fluctuation factor.

* * * * *